Patented Feb. 15, 1944

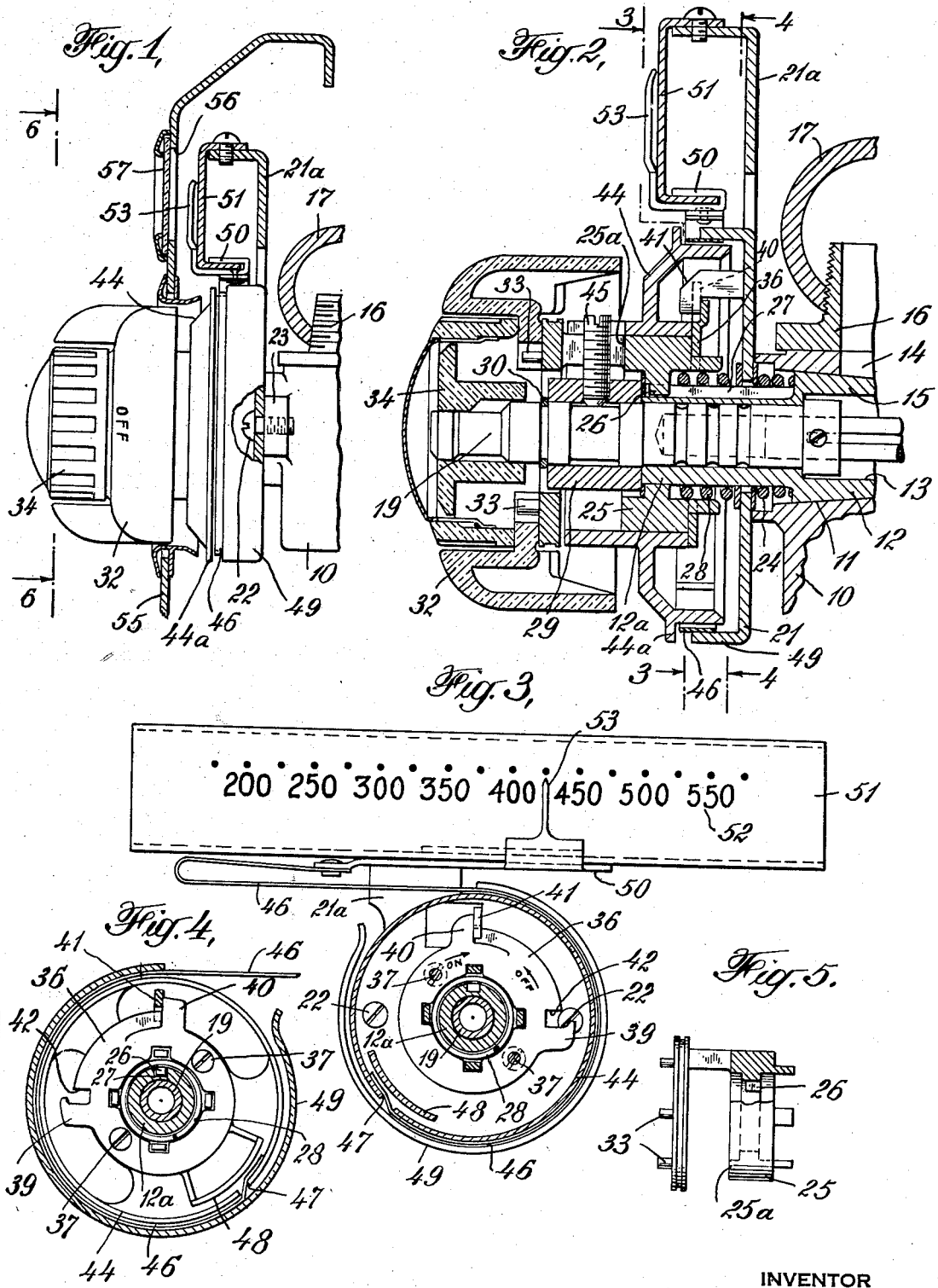

2,341,647

UNITED STATES PATENT OFFICE 2,341,647

CONTROL DEVICE FOR COOKING RANGES

Malcolm K. Parkhurst, New York, N. Y., assignor to The Wilcolator Company, Newark, N. J., a corporation of Delaware Application May 15, 1941, Serial No. 393,684

3 Claims. (Cl. 236—94)

This invention relates to control devices for cooking ranges having rotatable means for adjusting the device to different settings, and has particular reference to a device of this type including novel means for indicating the setting for which the rotatable means is adjusted. The indicating means of the new control device is characterized by an indicator movable with the adjusting means in a path which is non-concentric to the axis of rotation of the adjusting means, as, for example, in a straight line.

The control device of my invention may be used for various purposes. For example, it may be employed to control the setting of a timing mechanism for operating a bell or other signal device after a selected time interval to indicate when a cooking operation is completed, or it may be used to control the temperature adjustment of a thermostatic regulator for an oven. For illustrative purposes, the invention will be described in connection with an oven temperature regulator, although it will be understood that the invention is not limited to this use.

Temperature regulators of the adjustable type, as generally made, include a dial having a scale of temperature graduations and a pointer for indicating on the scale the different temperatures for which the adjustment handle is set. Either the dial or the pointer is connected to the handle so as to rotate with it, and with this construction it is necessary to arrange the scale of temperature graduations in concentric relation to the axis of rotation of the adjustment means, the scale commonly extending around the handle through an angle of substantially 360°. With the graduations so arranged, they are not as readily discernible as they would be if they were arranged in a straight line. I am aware that indicators have been provided heretofore in which a pointer is movable in a straight line over a scale of graduations by a rotatable handle, but these prior indicators are unsuited for use in temperature regulating devices, such as oven regulators, for various reasons among which are the complexity of the prior devices, their space requirements and the fact that considerable slack may develop in the connection between the handle and the pointer so that the pointer does not follow accurately the rotation of the handle.

One feature of the present invention, therefore, resides in the provision of a novel control device in which the means for indicating the setting of the adjustment handle has substantially a straight line movement and, in addition, is simple and compact in construction and accurate in operation at all times. A control device made in accordance with my invention comprises an adjusting means rotatable to adjust the device to different settings, and an indicator which is preferably movable along a scale in a straight line to indicate the setting of the adjusting means. The indicator is operated by the adjusting means through a connection which may include a flexible strip, such as a strip of spring metal, connected at one end to the adjusting means and at the opposite end to the indicator. Preferably, the flexible strip is bent over a drum to which it is connected at one end, and the drum, in turn, is connected to the adjusting means so as to rotate with it, the connection between the drum and the adjusting means being releasable to permit calibration of the device. If desired, stationary guide means may be disposed adjacent the periphery of the drum so as to extend along the outer face of the part of the flexible strip which is bent over the drum.

With this construction, the flexible strip is operable in tension to actuate the indicator on rotation of the adjusting means in one direction and is operable in compression to actuate the indicator on rotation of the adjusting means in the opposite direction. The strip extends tangentially from the axis of the drum, and the length of the tangential part, which is connected to the indicator, varies as the adjusting means rotates, whereby the indicator is moved along the scale. When the guide means adjacent the drum is employed, it not only protects the part of the flexible strip extending over the drum but also prevents any lost motion which might result from bulging of the strip away from the drum under compression.

Another feature of the invention resides in the provision of a novel temperature regulator in which the drum for the flexible strip of the indicator is mounted on means rotatable selectively to turn on and shut off the supply of gas, electricity or other operating medium regulated by the adjusting means. When it is desired to employ such a selector means, I prefer to have the temperature adjusting means extend through the selector means and provide the selector means intermediate its ends with a transverse slot through which extends a screw, or the like, for causing the drum on the selector means to rotate with the adjusting means. The slot permits rotation of the drum and the adjusting means relative to the selector means between these parts, and the slot may extend through an angle only slightly less than 360° to permit the adjusting means and the drum to rotate substantially a complete revolution relative to the selector means. Preferably, a handle is connected to the end of the selector means outwardly of its slot, and a second handle may be connected to the adjusting means in concentric relation to the handle for the selector means.

These and other features of the invention may be better understood by reference to the accompanying drawing, in which Fig. 1 is a side view partly in section showing one form of the new control device with parts broken away;

Fig. 2 is an enlarged, longitudinal sectional view of the device shown in Fig. 1;

Figs. 3 and 4 are secitonal views on the lines 3—3 and 4—4, respectively, in Fig. 2, and Fig. 5 is a detail view of part of the selector means shown in Fig. 2.

The control device of my invention may take various forms. For example, it may include a valve operated by a thermostat to control the supply of gas to a burner, or the thermostat may be arranged to actuate a switch for controlling the supply of current to an electric heater. In the drawing, I have shown a gas regulator suitable for controlling the temperature in the oven of a cooking range and including both a cut-off valve and a temperature regulating valve, the regulator being of the general type described and illustrated in Patent No. 2,151,541 issued March 21, 1939, to B. F. Waddell. As shown, the regulator comprises a casing 10 having a conical seat 11 for a cut-off valve 12 provided with a longitudinal passage 13. The cut-off valve is rotatable in the casing to turn on or shut off the flow of gas through an inlet port 14 in the side wall of the casing, the valve having an opening 15 which, in the "on" position, is aligned with the port 14. The casing is connected to a fitting 16 threaded into the manifold 17 of the gas range, and when the cut-off valve 12 is turned on, gas flows from the manifold through the fitting 16, port 14 and opening 15 into the cut-off valve and then flows inwardly along the passage 13 to the interior of the casing (not shown).

The rate of flow of gas from the interior of the casing to the oven burner is controlled by a regulating valve (not shown) responsive to the temperature in the oven. Adjustment of the regulating valve to different temperature settings may be effected manually by an adjustment means including a shaft 19 mounted in a reduced extension 12a of the cut-off valve and extending through the cut-off valve into the casing. The shaft 19 is rotatable relative to the cut-off valve and is connected in the casing to suitable means (not shown) whereby rotation of the shaft moves the regulating valve relative to its seat.

The extension 12a of the cut-off valve projects through a plate 21 connected to the front end of the casing, as by means of screws 22 threaded into flanges 23 on the casing. A compression spring 24 is coiled around this extension between the plate 21 and the shoulder of the extension, the spring urging the cut-off valve inwardly so as to hold it tightly against its seat. Mounted on the cut-off valve extension 12a is a sleeve 25 having a key 26 slidable in a keyway 27 in the extension, whereby the sleeve and the cut-off valve rotate together and the sleeve forms in effect a part of the cut-off device or selector means. The inner end of the sleeve 25 is recessed to receive a spring 28 coiled around the extension 12a, the spring 28 being compressed between the plate 21 and a shoulder on the sleeve. The sleeve 25 is urged outwardly by spring 28 toward a collar 29 which is secured against outward movement on the adjustment shaft 19 by a spring element 30 fitted in a circumferential grove in a shaft.

A handle 32 is keyed to the sleeve 25, as by means of pins 33 projecting from the front end of the sleeve into recesses in the handle. The handle is held on the sleeve by a second handle 34 removably mounted on the shaft 19 and operable to rotate the shaft. The cut-off valve is rotatable by handle 32 between the "on" position shown in Fig. 2 and an "off" position wherein the opening 15 is remote from the port 14 so that the flow of gas through the cut-off valve and the regulating valve to the burner is interrupted. As the cut-off valve rotates, the adjustment shaft 19 and its handle 34 rotate with it due to the friction between the shaft and the extension of the cut-off valve which carries it. However, the shaft 19 is rotatable by handle 34 independently of the cut-off valve and while the latter is stationary, whereby the regulator is adjusted to different temperature settings.

Rotation of the cut-off valve between its two positions is limited by a plate 36 secured to the inner end of sleeve 25, as by means of screws 27. Projecting radially from the periphery of plate 36 are two arms 39, 40 disposed substantially 90° apart and engageable with a stop 41 on the plate 21. In any position of the cut-off valve other than its "off" position, a downwardly extending part of the stop 41 engages the outer portion of plate 36 and limits the outward movement of sleeve 25 under the action of spring 28. However, when the cut-off valve is turned to its "off" position in which the arm 39 engages stop 41, a slot 42 in plate 36 assumes a position opposite the stop so that the sleeve 25 and its plate are snapped outwardly by spring 28 against collar 29, and the downwardly extending part of the stop is disposed in the slot 42, whereby the cut-off valve and its handle are locked against rotation. When it is desired to turn the cut-off valve to its "on" position, the handle 32 is pushed inwardly against the action of spring 28 so as to move the plate 36 and its slot 42 to the rear of the downwardly extending part of stop 41, and then the handle is turned clockwise, as seen in Fig. 3, until the arm 40 engages the stop.

The temperature indicating means for the regulator comprises a drum 44 having a hub portion mounted for rotation on the sleeve 25. At its outer end, the hub is slotted to receive a set screw 45 extending through a slot 25a in the sleeve and threaded in the collar 29 so as to lock the collar to the adjustment shaft. The slot 25a, as shown, extends circumferentially of the sleeve through an angle slightly less than 360°, whereby the adjustment shaft 19, collar 29, screw 45 and drum 44 may be rotated by handle 34 through substantially a complete revolution and a wide range of adjustment may be obtained. A flexible strip 46 made of spring metal, or the like, is bent over the periphery of the drum and is secured at one end to the drum, as by inserting the end through a slot 47 in the periphery and locating this end between the adjacent inner face of the drum and an arcuate member 48 on the drum. Preferably, the plate 21 is provided with a flange 49 concentric to the drum and disposed in closely adjacent relation to its periphery, whereby the flange serves not only to shield the part of the strip 46 bent over the drum but also as a guide means to hold this part in contact with the drum at all times. If desired, the drum may be provided with a peripheral flange 44a adjacent the outer edge of the flexible strip.

The strip 46 extends tangentially from the periphery of the drum and is reversed upon itself and connected at its free end to a slide 50 mounted on one of the flanges of a channel-shaped dial member 51. The dial 51 may be secured in any suitable manner to an extension 21a of the plate 21 and has a dial face 52 on which a scale of temperature graduations is arranged in a substantially straight line. The slide 50 is movable on the flange of the dial 51 as a track and is provided with a pointer 53 for indicating different temperatures on the scale.

The regulator is preferably mounted on the range with the dial 51 and pointer 53 disposed behind the usual panel 55, and a horizontal slot 56 is formed in the panel in front of the dial. The slot 56 may be covered by a transparent element 57 through which the scale of graduations may be viewed.

In operation, when the handle 34 is rotated to effect the desired temperature setting, the drum 44 rotates with it and causes the tangential portion of strip 46 to increase or decrease in length, depending upon the direction of rotation, whereby the pointer 53 is moved along the scale to indicate the temperature corresponding to the setting of the adjustment shaft 19. When the shaft is turned clockwise, as viewed in Fig. 3, the drum subjects the flexible strip 46 to tension and draws it in so as to shorten the length of its tangential portion, whereby the indicator 53 moves to the right on the scale. However, when the adjustment shaft is rotated counter-clockwise, the drum subjects the strip 46 to compression and increases the length of its tangential portion, thereby moving the indicator to the left. During counter-clockwise movement of the adjustment shaft, any tendency for the strip 46 to bulge under compression away from the periphery of the drum is resisted by the guide member 49, and, accordingly, there is substantially no lost motion between the adjustment handle 34 and the indicator 53. The regulator may be readily calibrated by determining the temperature maintained with a predetermined setting of the shaft 19, loosening the set screw 45 and, with the shaft in its predetermined setting, rotating the drum 44 relative to the shaft to move the indicator 53 opposite the graduation corresponding to the temperature thus determined. The set screw 45 is then tightened to lock the collar 29 and the drum to the shaft.

The indicating means of my new regulator is of compact construction and is adapted for manufacture at low cost. The dial 51 and guide member 49 are arranged in a unitary assembly on the plate 21, and the indicating means may be assembled readily by connecting the plate 21 to the casing, mounting the drum with its flexible strip and indicator on the sleeve 25 and placing the slide of the indicator over the end of the flange on the dial 51. The spring element 30 may then be snapped in its groove in the adjustment shaft to hold the collar 29 in position, and the drum locked to the shaft by tightening the screw 45 in the collar. In disassembling the regulator for cleaning or repair purposes, the handles 32 and 34 are removed and the spring element 30 is forced out of its groove so that on loosening the screw 45 the collar 29, sleeve 25 and drum 44 may be withdrawn from the cut-off valve and the adjusting shaft. These last two elements may be removed from the casing by disconnecting the plate 21 from the front of the casing.

While I have illustrated the indicating means of my new regulator in combination with a cut-off device 12—25, it will be understood that the cut-off device may be eliminated. Also, the adjusting means may be arranged to adjust a thermo-responsive switch, a timing mechanism or other device instead of the regulating valve referred to.

I claim:

1. In a temperature regulator having selector means rotatable between "off" and operating positions, and a temperature adjustment shaft concentric to the selector means and rotatable relative thereto, the combination of a sleeve keyed to said selector means, a drum mounted on the sleeve for rotation relative thereto, a device for indicating the temperature for which the shaft is adjusted, a flexible strip bent over the drum and connected at one end to the drum and at the other end to the indicating device, the strip being sufficiently stiff to act as a column in compression to actuate said device on rotation of the drum, means for holding the strip adjacent the drum means for causing the drum to rotate with the shaft, a spring biasing the sleeve axially in one direction on said member, and means on the sleeve for locking the sleeve and said member against rotation, the sleeve being movable axially in the opposite direction against the spring to release said locking means.

2. In a temperature regulator having selector means rotatable between "off" and operating positions, and a temperature adjustment shaft concentric to the selector means and rotatable relative thereto, the combination of a drum mounted on the selector means for rotation relative thereto, a device for indicating the temperature for which the shaft is adjusted, a flexible strip bent over the drum and connected at one end to the drum and at the other end to the indicating device, the strip being sufficiently stiff to act as a column in compression to actuate said device on rotation of the drum, means for holding the strip adjacent the drum, a collar mounted on the shaft within the selector means, and locking means for causing the collar and drum to rotate with the shaft, the selector means having an elongated slot through which said locking means extends to permit relative rotation of the selector means and shaft.

3. In a temperature regulator having selector means rotatable between "off" and operating positions, and a temperature adjustment shaft concentric to the selector means and rotatable relative thereto, the combination of a drum mounted on the selector means for rotation relative thereto, a plate adjacent the drum and having stops for limiting rotation of the selector means, a dial member on the plate having a scale of temperature graduations, a slide having an index coacting with said scale, a flexible strip bent over the drum and connected at one end to the drum and at the other end to the slide, the strip being sufficiently stiff to act as a column in compression and move the slide along the scale to indicate different temperatures on rotation of the drum, a guide member on the plate substantially concentric to the drum and disposed adjacent the outer face of the strip on the drum and means for causing the drum to rotate with the shaft.

MALCOLM K. PARKHURST.